(12) United States Patent  
Yamada et al.

(10) Patent No.: US 8,575,919 B2
(45) Date of Patent: Nov. 5, 2013

(54) INCLINATION DETECTION METHOD AND INCLINATION DETECTION APPARATUS

(75) Inventors: Hideaki Yamada, Shimo-suwa-machi (JP); Michihiro Nagaishi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 511 days.

(21) Appl. No.: 12/843,818

(22) Filed: Jul. 26, 2010

(65) Prior Publication Data

US 2011/0018554 A1 Jan. 27, 2011

(30) Foreign Application Priority Data

Jul. 27, 2009 (JP) ................................. 2009-173997

(51) Int. Cl.
*G01P 13/00* (2006.01)
*G01P 15/00* (2006.01)

(52) U.S. Cl.
USPC .......................................... 324/165; 702/141

(58) Field of Classification Search
USPC ................ 324/649, 600, 302, 750.22, 165
See application file for complete search history.

(56) References Cited

U.S. PATENT DOCUMENTS

| 3,952,173 | A | * | 4/1976 | Tsuji et al. ................... 200/511 |
| 4,279,417 | A | * | 7/1981 | Yokoi ............................ 273/442 |
| 4,713,539 | A | * | 12/1987 | Hackman ................... 250/208.4 |
| 5,367,199 | A | * | 11/1994 | Lefkowitz et al. ............ 307/116 |
| 2007/0043304 | A1 | * | 2/2007 | Katayama ..................... 600/549 |

FOREIGN PATENT DOCUMENTS

| JP | 05-118842 A | 5/1993 |
| JP | 08-145776 A | 6/1996 |
| JP | 10-262498 A | 10/1998 |
| JP | 10-319930 A | 12/1998 |
| JP | 2005-315627 A | 11/2005 |
| JP | 2006260849 A | * | 9/2006 |

* cited by examiner

*Primary Examiner* — Hoai-an D Nguyen
(74) *Attorney, Agent, or Firm* — Kilpatrick Townsend & Stockton LLP

(57) ABSTRACT

An inclination detection method is disclosed, which uses a pair of electrodes placed so as to face each other and having a fixed positional relation and an electric conductor which can move between the pair of electrodes, wherein the pair of electrodes is in either a conducting state or a nonconducting state depending on the position of the movable electric conductor, the conducting state in a predetermined period is expressed as any one of a plurality of level values, and a movement state of the pair of electrodes is estimated based on which of the plurality of level values the conducting state takes on.

13 Claims, 7 Drawing Sheets

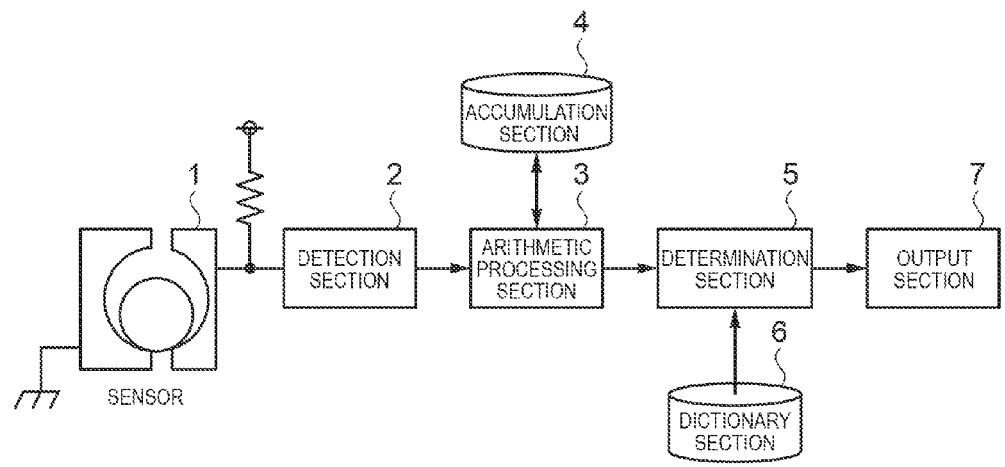
FIG. 1
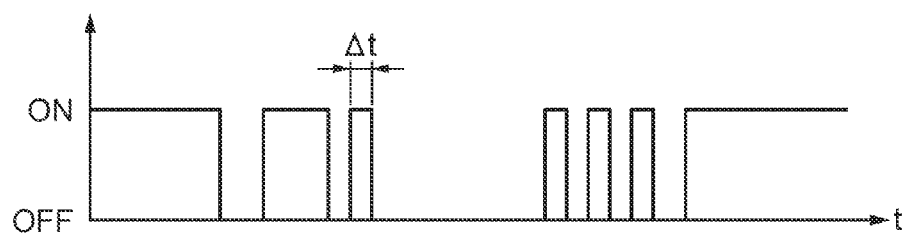
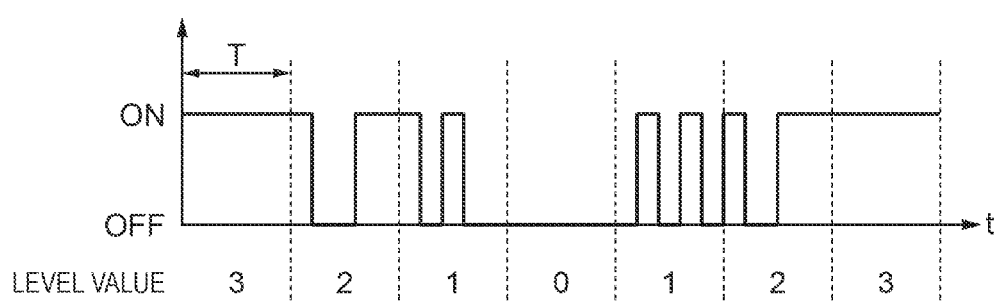
FIG. 2

INCLINATION DETECTION METHOD AND INCLINATION DETECTION APPARATUS

BACKGROUND

1. Technical Field

The present invention relates to inclination detection methods and inclination detection apparatuses.

2. Related Art

In general, detection of the movement state of a body is often performed by attaching an acceleration sensor or an angular velocity sensor (a gyroscope) to the body. Objects for which such a sensor is used include a wide variety of objects, such as automobiles, planes, ships, and industrial robots. When the sensor is used for such an object, the accuracy of the sensor is important, and power consumption is of secondary concern. However, when the movement of an inclined surface, for example, is measured, how much the sensor itself consumes power is sometimes more important than the accuracy of the sensor due to the difficulty of supplying required power depending on the location in which the sensor is placed.

As a low-power consumption sensor, an inclination sensor using a spherical electric conductor is known. When such an inclination sensor is used, although a specific state can be detected, the accuracy of measurement of a subtle state change is lower than that of the commonly-used acceleration sensor and angular velocity sensor. Therefore, the inclination sensor is sometimes used for applications which do not require too much accuracy and when it is necessary to reduce power consumption.

As an example of an inclination sensor, JP-A-5-118842 (Patent Document 1), for example, proposes a directional sensor apparatus which provides a plurality of depressions having electrodes on the inner periphery of a ring-shaped frame and detects the direction of rotation (direction of inclination) based on in which depression of the plurality of depressions an electric conductor moving the inside of the ring-shaped frame is located.

Moreover, JP-A-10-319130 (Patent Document 2) proposes a seismometer which is used for calculating an earthquake intensity by accumulating the ON time of the ON/OFF pulse time generated by the vibration of a movable electric conductor.

However, the directional sensor apparatus of Patent Document 1 has a problem in the difficulty of forming a plurality of depressions having electrodes on the inner periphery of a ring-shaped frame. In addition, the seismometer of Patent Document 2 has a problem in the difficulty of reducing power consumption because the load on an arithmetic processing section (a CPU, a memory, a determination program, etc.) for determining an earthquake intensity based on an ON pulse train coming from the movable electric conductor. If an inclination sensor (an inclination detection apparatus) with accuracy that allows the inclination sensor to be used as an alternative to the common acceleration sensor and angular velocity sensor, there is a possibility that the inclination sensor will be used for wider applications.

SUMMARY

An advantage of some aspects of the invention is to solve at least part of the problems described above, and the invention can be implemented as the following embodiments or application examples of an inclination detection method and inclination detection apparatus.

Application Example 1

An inclination detection method according to this application example uses a pair of electrodes placed so as to face each other and having a fixed positional relation and an electric conductor which can move and lies between the pair of electrodes, wherein the pair of electrodes is in either a conducting state or a nonconducting state depending on the position of the movable electric conductor, the conducting state in a predetermined period is expressed as any one of a plurality of level values, and the movement state of the pair of electrodes is estimated based on which of the plurality of level values the conducting state takes on.

With this method, by using the pair of electrodes placed so as to face each other and having a fixed positional relation and the electric conductor which can move and lies between the pair of electrodes and expressing the conducting state of the pair of electrodes, the conducting state generated by the movement of the movable electric conductor, as a plurality of level values, it is possible to identify the movement state of the pair of electrodes by using the level values. For example, by securing to a body of an animal an apparatus to which the inclination detection method according to this application example is applied, the pair of electrodes moves according to the movement of the animal, and, since the conducting state and the nonconducting state are generated in the pair of electrodes by the movement of the movable electric conductor lying between the pair of electrodes, it is possible to identify the movement of the animal.

Here, the predetermined period is a time interval which may be appropriately set according to the rate of the movement of an object whose state is to be detected. For example, though not limited thereto, it is often preferable to set the predetermined period at 10 to 30 ms for animals.

Application Example 2

In the inclination detection method according to the above-referenced application example, it is preferable to estimate a change in the movement state of the pair of electrodes based on a change in the values of the plurality of level values in the consecutive predetermined periods.

With this method, a change in the plurality of level values in the consecutive predetermined periods can be considered as changing according to the continuous movements of an animal, for example. Therefore, it is possible to know the activity status of the animal fitted with an apparatus to which the inclination detection method according to this application example is applied.

Application Example 3

In the inclination detection method according to the above-referenced application example, it is preferable that the plurality of level values be each defined by a proportion of the time of the conducting state in the predetermined period.

With this method, since the conducting state of the pair of electrodes in the predetermined period can be considered as indicating the characteristics of the activity status of an animal fitted with an apparatus to which the inclination detection method according to this application example is applied, defining how to set the plurality of level values based on a proportion of the time of the conducting state of the pair of electrodes in the predetermined period can be considered as one effective way of definition.

Application Example 4

In one of the inclination detection methods according to the above-referenced application examples, it is preferable that the predetermined period be the sum of a plurality of predetermined sampling times, detection of the conducting state and the nonconducting state be performed by performing sampling in the predetermined sampling time, when a result of the sampling indicates the conducting state, the pair of electrodes be considered to have been in the conducting state in a period of the last predetermined sampling time, and, when a result of the sampling indicates the nonconducting state, the pair of electrodes be considered to have been in the nonconducting state in a period of the last predetermined sampling time.

With this method, since the predetermined period is a time interval which is the integral multiple of a predetermined sampling time, it is possible to eliminate a sampling time which spans the consecutive predetermined periods. The predetermined sampling time is a time interval determined by a sampling period which is appropriately set according to an object to be detected. Detecting the conducting state or the nonconducting state of the pair of electrodes in the predetermined sampling time and considering the detection result as the conducting state or the nonconducting state of the pair of electrodes in the last sampling time prevent the circuit configuration from becoming complicated, and makes it easy to achieve quantization into a plurality of level values.

Application Example 5

In one of the inclination detection methods according to the above-referenced application examples, it is preferable that the predetermined period be defined as a gate time, first timing with which the pair of electrodes is changed from the nonconducting state to the conducting state and second timing with which the pair of electrodes is changed from the conducting state to the nonconducting state be detected, and a proportion of the time of the conducting state of the pair of electrodes in the gate time be detected based on the first timing and the second timing.

With this method, by detecting the first timing and the second timing, a proportion of the time in which the pair of electrodes is in the conducting state can be detected accurately. Here, the gate time is a time interval set as a measurement range, and can be set arbitrarily. The gate time may be a time interval in which estimation of the movement of an object to be detected is assumed to be possible.

Application Example 6

In one of the inclination detection methods according to the above-referenced application examples, it is preferable that the predetermined period be defined as a gate time, and, based on a first number which is the number of changes of the pair of electrodes from the nonconducting state to the conducting state and a second number which is the number of changes of the pair of electrodes from the conducting state to the nonconducting state, a proportion of the time of the conducting state of the pair of electrodes in the gate time be estimated.

With this method, based on the first number and the second number, it is possible to estimate the time in which the pair of electrodes has been in the conducting state in the predetermined period. The circuit configuration can be made simpler because it is only necessary to count the first number and the second number, and it is possible to determine easily which of the plurality of level values the conducting state takes on. Here, the gate time is a time interval set as a measurement range, and can be set arbitrarily. The gate time may be a time interval in which estimation of the movement of an object to be detected is assumed to be possible.

Application Example 7

In the inclination detection method according to the above-referenced application examples, it is preferable that movement state data which relates a change in the plurality of level values to a change in the movement of the pair of electrodes be prepared, and the movement of a body provided with the pair of electrodes and the movable electric conductor be estimated by comparing a detection result of a change in the plurality of level values corresponding to the plurality of periods with the movement state data.

With this method, by preparing movement state data of a body whose movement is to be detected, for example, an animal, in advance and comparing a change in the plurality of level values with the movement state data, it is possible to know the state of the movement of the target animal easily.

Application Example 8

In the inclination detection method according to the above-referenced application example, it is preferable that the movable electric conductor be a spherical electric conductor.

With this method, since the movable electric conductor is spherical, it is possible to reduce the influence of the inclination angle of the pair of electrodes on the movement of the electric conductor.

Application Example 9

An inclination detection apparatus according to this application example includes: a pair of electrodes placed so as to face each other and having a fixed positional relation; and an electric conductor which can move and lies between the pair of electrodes, wherein the pair of electrodes is in either a conducting state or a nonconducting state depending on the position of the movable electric conductor, in a predetermined period, the conducting state is expressed as any one of a plurality of level values, and the movement state of the pair of electrodes is estimated based on which of the plurality of level values the conducting state takes on.

With this configuration, by including the pair of electrodes placed so as to face each other and having a fixed positional relation and the electric conductor which can move and lies between the pair of electrodes and expressing the conducting state of the pair of electrodes, the conducting state generated by the movement of the movable electric conductor, as a plurality of level values, it is possible to identify the movement state of the pair of electrodes. By securing the inclination detection apparatus according to this application example to a body of an animal, the pair of electrodes moves according to the movement of the animal, and, since the conducting state and the nonconducting state are generated in the pair of electrodes by the movement of the movable electric conductor lying between the pair of electrodes, it is possible to provide an inclination detection apparatus which can identify the movement of the animal.

Application Example 10

In the inclination detection apparatus according to the above-referenced application example, it is preferable that a change in the movement state of the pair of electrodes be estimated based on a change in the plurality of level values in the consecutive plurality of predetermined periods.

With this configuration, a change in the plurality of level values in the consecutive plurality of predetermined periods can be considered as corresponding to the continuous movements of an animal, for example. Therefore, it is possible to estimate the activity status of the animal fitted with the inclination detection apparatus according to this application example.

Application Example 11

In the inclination detection apparatus according to the above-referenced application example, it is preferable that the plurality of level values be each determined by a proportion of the time of the conducting state in the predetermined period.

With this configuration, since the conducting state of the pair of electrodes in the predetermined period can be considered as indicating the characteristics of the activity status of an animal fitted with the inclination detection apparatus according to this application example, defining how to set the plurality of level values based on a proportion of the time of the conducting state of the pair of electrodes in the predetermined period can be considered as one effective way of definition.

Application Example 12

In one of the inclination detection apparatuses according to the above-referenced application examples, it is preferable that the predetermined period be the sum of a plurality of predetermined sampling times, detection of the conducting state and the nonconducting state be performed by performing sampling in the predetermined sampling time, when a result of the sampling indicates the conducting state, a period of the last predetermined sampling time be considered as the time in which the pair of electrodes has been in the conducting state, and, when a result of the sampling indicates the nonconducting state, a period of the last predetermined sampling time be considered as the time in which the pair of electrodes has been in the nonconducting state.

With this configuration, since the predetermined period is a time interval which is the integral multiple of a predetermined sampling time, it is possible to eliminate a sampling time which spans the consecutive predetermined periods. The predetermined sampling time is a time interval determined by a sampling period which is appropriately set according to an object to be detected. Detecting the conducting state or the nonconducting state of the pair of electrodes in the predetermined sampling time and considering the detection result as the conducting state or the nonconducting state of the pair of electrodes in the last sampling time prevent the circuit configuration from becoming complicated, and makes it easy to achieve quantization into a plurality of level values.

Application Example 13

In one of the inclination detection apparatuses according to the above-referenced application examples, it is preferable that the predetermined period be defined as a gate time, first timing with which the pair of electrodes is changed from the nonconducting state to the conducting state and second timing with which the pair of electrodes is changed from the conducting state to the nonconducting state be detected, and a proportion of the time of the conducting state of the pair of electrodes in the gate time be detected based on the first timing and the second timing.

With this configuration, by detecting the first timing and the second timing, a proportion of the time in which the pair of electrodes is in the conducting state can be detected accurately. Here, the gate time is a time interval set as a measurement range, and can be set arbitrarily. The gate time may be a time interval in which estimation of the movement of an object to be detected is assumed to be possible.

Application Example 14

In one of the inclination detection apparatuses according to the above-referenced application examples, it is preferable that the predetermined period be defined as a gate time, and, based on a first number which is the number of changes of the pair of electrodes from the nonconducting state to the conducting state and a second number which is the number of changes of the pair of electrodes from the conducting state to the nonconducting state, a proportion of the time of the conducting state of the pair of electrodes in the gate time be determined.

With this configuration, based on the first number and the second number, it is possible to estimate the time in which the pair of electrodes has been in the conducting state in the predetermined period. Since it is only necessary to count the first number and the second number, it is possible to determine which of the plurality of level values the conducting state takes on with a simple circuit configuration. Here, the gate time is a time interval set as a measurement range, and can be set arbitrarily. The gate time may be a time interval in which estimation of the movement of an object to be detected is assumed to be possible.

Application Example 15

In the inclination detection apparatus according to the above-referenced application example, it is preferable that the pair of electrodes have concave portions on the sides thereof facing each other, and the movable electric conductor lie in a space formed by the concave portions of the pair of electrodes.

With this configuration, it is possible to configure an inclination detection apparatus with a simple structure.

Application Example 16

In the inclination detection apparatus according to the above-referenced application example, it is preferable that the movable electric conductor be a spherical electric conductor.

With this configuration, since the movable electric conductors is spherical, it is possible to reduce the influence of the inclination angle of the pair of electrodes on the movement of the electric conductor.

Application Example 17

In the inclination detection apparatus according to the above-referenced application example, it is preferable that movement state data which relates a change in the plurality of level values to a change in the movement of the pair of electrodes be prepared, and the movement of a body provided with the pair of electrodes and the movable electric conductor be detected by comparing a detection result of a change in the plurality of level values with the movement state data.

With this configuration, by preparing movement state data of a body whose movement is to be detected, for example, an animal, in advance and comparing a change in the plurality of level values with the movement state data, it is possible to know the state of the movement of the target animal easily.

BRIEF DESCRIPTION OF THE DRAWINGS

The invention will be described with reference to the accompanying drawings, wherein like numbers reference like elements.

FIG. 1 is a block diagram of an inclination detection apparatus used in describing an embodiment of the invention.

FIG. 2 is a chart showing conversion from a pulse train to a data string of a plurality of level values in a first embodiment.

DESCRIPTION OF EXEMPLARY EMBODIMENTS

Figure 3:
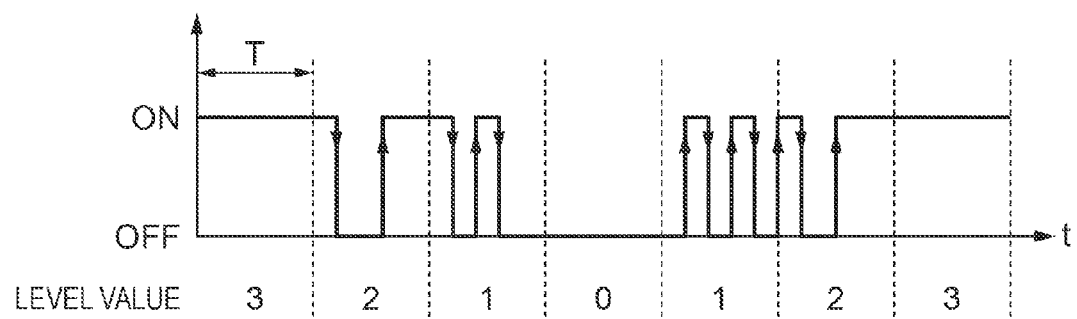
FIG. 3 is a chart showing conversion from a pulse train to a data string of a plurality of level values in a second embodiment.

Hereinafter, embodiments of an inclination detection method and an inclination detection apparatus of the invention will be described by using drawings.

First, a block diagram of the inclination detection apparatus is shown in FIG. 1, and the functions of the component elements are described below. The block diagram shown in FIG. 1 aims to show principal component elements of the inclination detection apparatus, and therefore does not include all the component elements of the inclination detection apparatus. Moreover, all embodiments described later have the same component elements.

In FIG. 1, a sensor 1 includes a pair of electrodes and a spherical electric conductor which can move between the pair of electrodes. In FIG. 1, in the sensor 1, the spherical electric conductor is in contact with each of the pair of electrodes, and the pair of electrodes is in a conducting state. In FIG. 1, the side on which the spherical electric conductor in the sensor 1 is present, that is, a lower side of the drawing corresponds to the direction of gravitational force. When the sensor 1 rotates 90 degrees and one of the pair of electrodes comes to the lower side of the drawing, that is, the side corresponding to the direction of gravitational force, the spherical electric conductor makes contact only with the electrode on the side corresponding to the direction of gravitational force, and the pair of electrodes enters a nonconducting state.

When some impacts are given to the sensor 1 and the pair of electrodes moves, the spherical electric conductor vibrates between the pair of electrodes due to an inertial force of the spherical electric conductor and the impacts given from the pair of electrodes. This vibration brings about a conducting state or a nonconducting state between the pair of electrodes.

The conducting state and the nonconducting state of the sensor 1 are output to a detection section 2, and are converted into a pulse train as a result of conversion into a binary value based on a threshold appropriately set by the detection section 2. The data obtained in the form of a pulse train is output to an arithmetic processing section 3 in chronological order. The accumulation section 4 temporarily stores the data which is used by the arithmetic processing section 3 for processing. The arithmetic processing section 3 converts the pulse train output from the detection section 2 within a predetermined period into any level value of a plurality of level values, and outputs the level value to a determination section 5. As a result, the level values output to the determination section 5 become a data string corresponding to a time series of a predetermined period.

The determination section 5 divides the data string corresponding to the time series of the predetermined period, determines the movement of an object fitted with the inclination detection apparatus by checking a change in the data strings obtained by division against the movement state data of a body, the data stored in advance in a dictionary section 6, and outputs the determination result to an output section 7.

First Embodiment

This embodiment shows one method for converting a pulse train input to the arithmetic processing section 3 in chronological order into a data string of a plurality of level values in the above-described inclination detection apparatus. Moreover, in the description given in this embodiment, the movement of the above-described inclination detection apparatus will be described again. The output from the sensor 1 is in either a "conducting state" (hereinafter referred to as "ON") or a "nonconducting state" (hereinafter referred to as "OFF"). To differentiate between ON and OFF, a threshold according to a voltage applied to the sensor 1 is set in the detection section 2 in advance.

The detection section 2 performs sampling on the outputs of the sensor 1 based on a sampling clock set in advance. This sampling time is assumed to be Δt. The data of a pulse train generated by the detection section 2 is shown in an upper chart of FIG. 2. When the object fitted with the inclination detection apparatus is an animal, it is often preferable to set the sampling time Δt 5 to 10 ms.

The arithmetic processing section 3 sequentially stores the data of a pulse train sent from the detection section 2 in the accumulation section 4. After the arithmetic processing section 3 receives the data of a pulse train for a predetermined period T, the arithmetic processing section 3 reads the data of a pulse train which corresponds to the predetermined period T and is stored in the accumulation section 4, and decides to which level value of a plurality of level values the pulse train in the predetermined period T corresponds.

In this embodiment, the predetermined period T is assumed to be five times Δt. When the state at the time of sampling is ON, the arithmetic processing section 3 assumes that the state is ON during Δt; when the state at the time of sampling is OFF, the arithmetic processing section 3 assumes that the state is OFF during Δt. A plurality of level values are set as follows.

The level value is assumed to be level 3 when the state is ON at all times in the predetermined period T.

The level value is assumed to be level 2 when [the sum of ON times] [the sum of OFF times] in the predetermined period T.

The level value is assumed to be level 1 when [the sum of ON times]<[the sum of OFF times] in the predetermined period T.

The level value is assumed to be level 0 when the state is OFF at all times in the predetermined period T.

When a plurality of level values are set in the manner as described above, the movement of the spherical electric conductor is not vigorous when the inclination detection apparatus often moves gently. Thus, it is considered that the state is often at the level 3 or a mixed state of the level 3 and the level 2. As the movement of the inclination detection apparatus becomes vigorous, the movement of the spherical electric conductor becomes vigorous, and switching between ON/OFF is increasingly frequent. Thus, it is considered that the level 2 and the level 1 form an increasing proportion of the state. Moreover, when the state remains at the level 3 or the level 0, it is considered that the object fitted with the inclination detection apparatus hardly moves.

An example of a pulse train and a level value in the predetermined period T when a plurality of level values are set in the manner as described above is shown in a lower chart of FIG. 2. The arithmetic processing section 3 outputs a data string of level values of a time series corresponding to a predetermined period T of a time series to a determination section 5.

The determination section 5 performs at least two types of processes. One of the two types of processes (hereinafter referred to as a "first process") is performed for dividing a data string of level values of a time series, the data string output from the arithmetic processing section 3, into an appropriate number of pieces of data. The other of the two types of processes (hereinafter referred to as a "second process") is performed for comparing each of the data strings obtained by division with a plurality of pieces of movement state data stored in the dictionary section 6.

Each of the plurality of pieces of movement state data stored in the dictionary section 6 is described in n consecutive level values. Therefore, in the first process, the determination section 5 has to divide a data string of level values of a time series into data strings of n consecutive level values.

There is no need to fix n of the above-described data strings of n consecutive level values. The plurality of pieces of movement state data may have individual lengths. Moreover, n may be fixed at a specific value. What value n takes on is determined by what movement state data each of the plurality of pieces of movement state data is, and an appropriate n is determined based on the result of analysis of a target movement.

Therefore, the determination section 5 has to recognize in advance in what length each of the plurality of pieces of movement state data is described and divide a data string of level values into an appropriate number (here, n1) of data in accordance with the plurality of pieces of movement state data stored in the dictionary section 6. For example, the determination section 5 may decide the above number based on the manner in which the values of the data string of level values change.

After the first process, the determination section 5 performs a second process in which comparison with a piece of movement state data having a length of n1 of the plurality of pieces of movement state data stored in the dictionary section 6 is performed, selects a corresponding piece of movement state data, and outputs the selection result to the output section 7 as the determination result. The determination section 5 repeatedly performs at least the first and second processes described above on the data strings of level values output thereto one after another.

Figure 5:
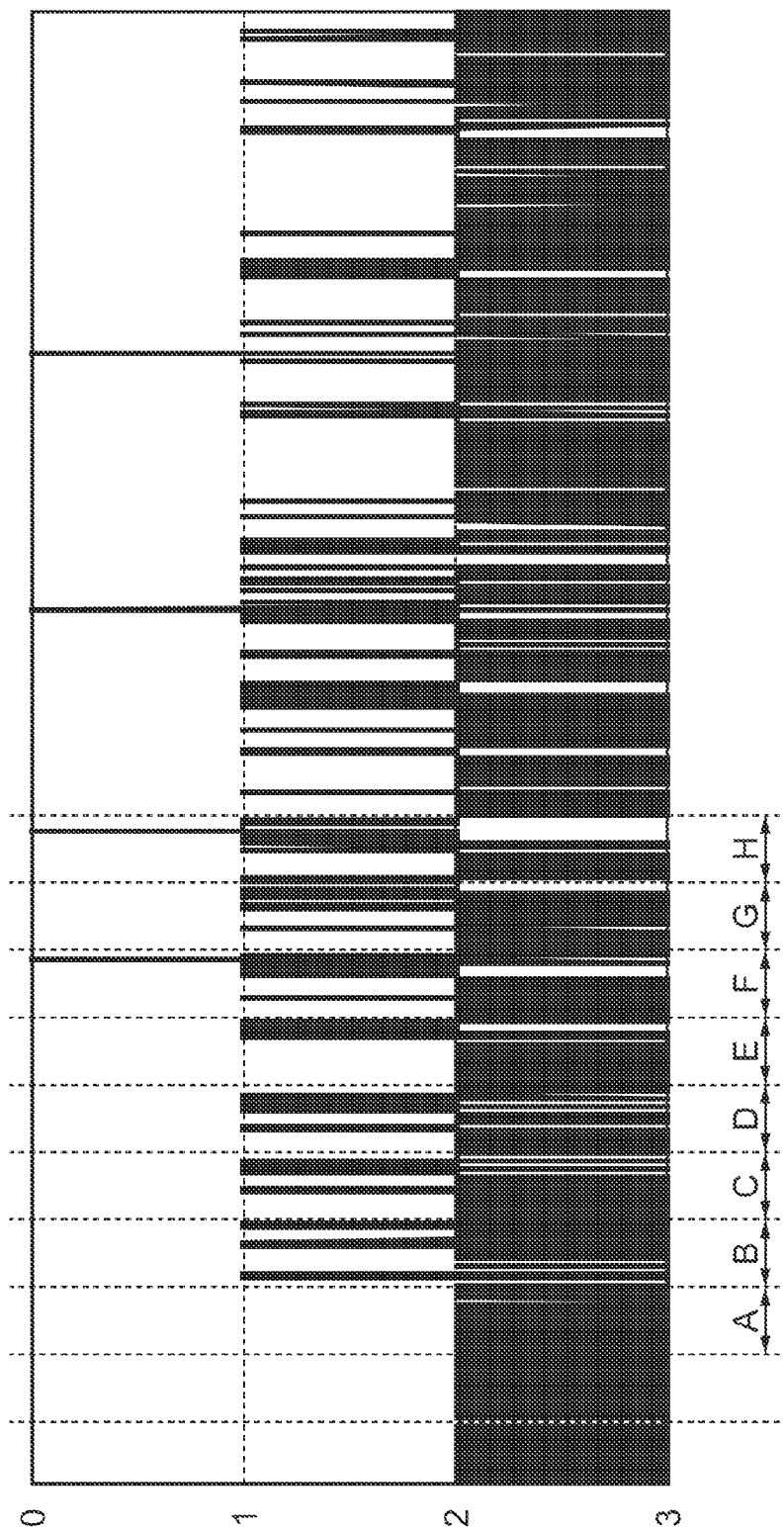
FIG. 5 is a time chart used in explaining determination of a movement state in the first embodiment.

Next, the operation of the determination section 5 when the movement state data obtained by attaching the inclination detection apparatus in this embodiment to an animal is stored in the dictionary section 6 will be described specifically. FIG. 5 is a data string of level values output from the arithmetic processing section 3 to the determination section 5. In FIG. 5, time passes from left to right. In addition, the vertical axis represents a level value. As for each level value, the level 3 is not shown, the level 2 is expressed in the form of a bar line extending from 3 to 2 of the vertical axis, the level 1 is expressed in the form of a bar line extending from 2 to 1 of the vertical axis, and the level 0 is expressed in the form of a bar line extending from 1 to 0 of the vertical axis. The level values are expressed in the same manner in FIGS. 6 to 8. Incidentally, FIGS. 5 to 8 have a portion in which a bar line seemingly lies on a plurality of levels. This is because the temporal axis is compressed in the drawings. In FIG. 5, A to H denote areas of the data string of level values, the data string divided by the determination section 5. The areas A to H are obtained by dividing the data string equally.

In FIG. 5, in a portion corresponding to the area A, data at the level 2 at which the proportion of ON to OFF in the predetermined period T is higher than the proportion of OFF to ON consecutively appears, and it can be presumed that the animal repeats the same, relatively gentle movement. For example, it can be assumed that the animal walks slowly at the same rate. Then, in a portion corresponding to the area B, the level 1 at which the proportion of OFF to ON is higher than the proportion of ON to OFF appears, and, also in the areas C to E, the level 1 at which the proportion of OFF to ON is higher than the proportion of ON to OFF appears in the same form as the area B. Based on this, it can be assumed that the animal repeats the same movement in the areas B to E, the movement which is slightly vigorous than the movement in the area A. Thus, it can be presumed that the animal starts to walk at a slightly fast pace.

In the areas F and H, a state at the level 0 appears. Since the frequency of occurrence of the level 0 is low, it can be considered that, although the animal continues to walk at a slightly fast pace, a sudden change occurs during this time period. For example, it can be assumed that the animal reduces the moving speed instantaneously because something cuts across in front of the animal. It can be assumed that, in the area G, the animal moves in the same manner as in the areas B to E. Based on the above, the movement of the animal in the areas A to H can be assumed as follows. The animal first walked slowly (the area A), then started to walk at a slightly fast pace (the areas B to H), and encountered two unexpected events affecting the walking pace (the areas F and H).

Figure 6:
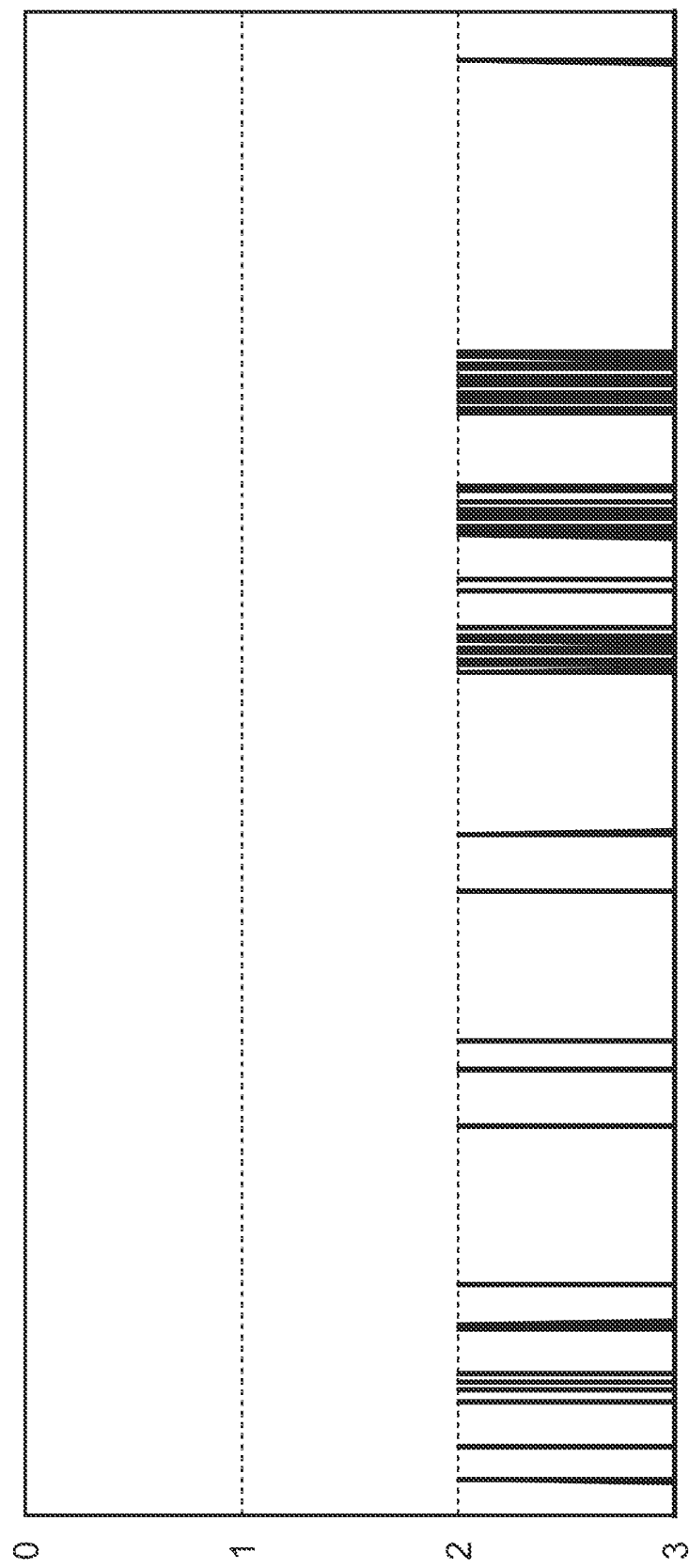
FIG. 6 is a time chart in an example of determination of a movement state in the first embodiment.
Figure 7:
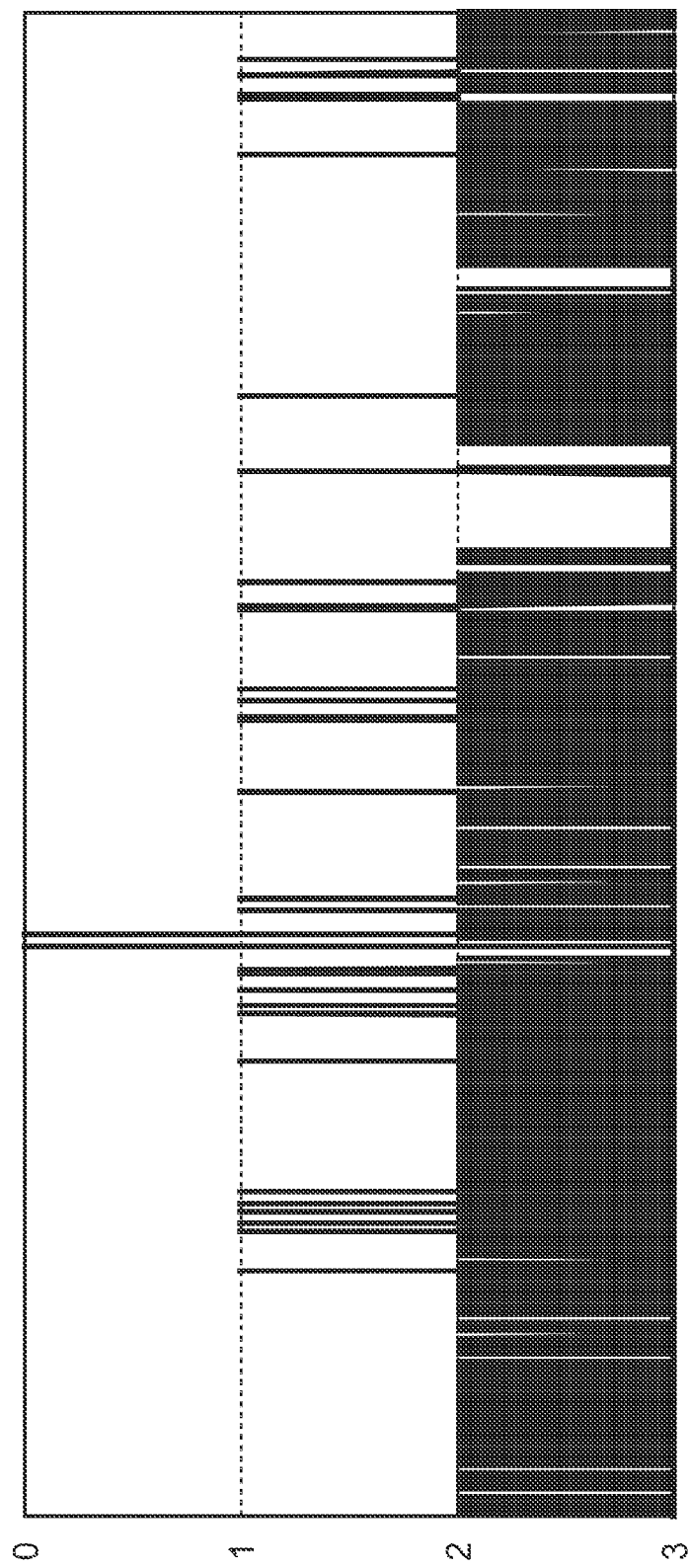
FIG. 7 is a time chart in an example of determination of a movement state in the first embodiment.
Figure 8:
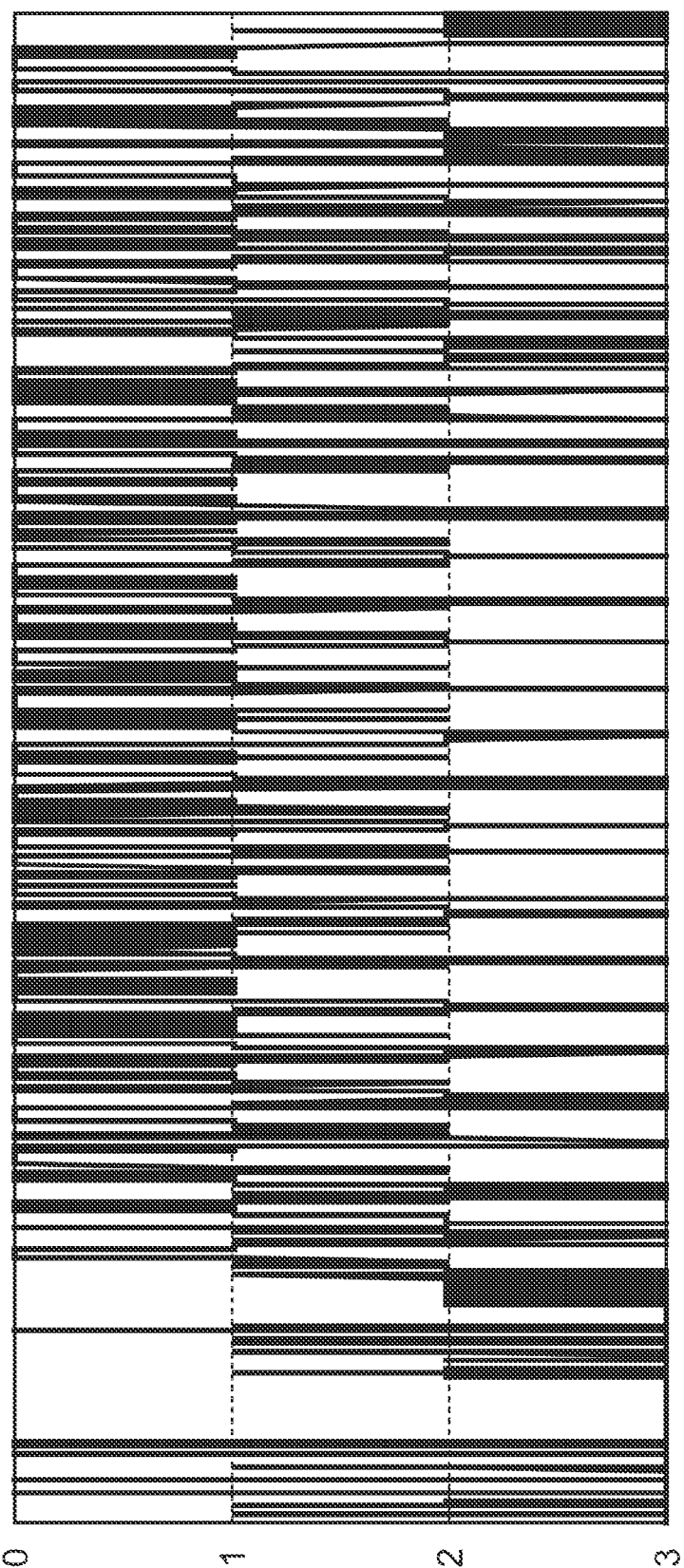
FIG. 8 is a time chart in an example of determination of a movement state in the first embodiment.

Examples of a data string of level values are shown in FIGS. 6 to 8. When the animal fitted with the inclination detection apparatus moves slowly and cautiously, a data string of level values shown in FIG. 6 is obtained. When the animal moves slowly and stops along the way, a data string of level values shown in FIG. 7 is obtained. Moreover, when the animal moves swiftly while sometimes stopping, a data string of level values shown in FIG. 8 is obtained. By storing the data shown in FIGS. 6 to 8 in the dictionary section 6 as the movement state data, it becomes possible to detect various movements of the animal fitted with the inclination detection apparatus according to this embodiment.

Figure 9:
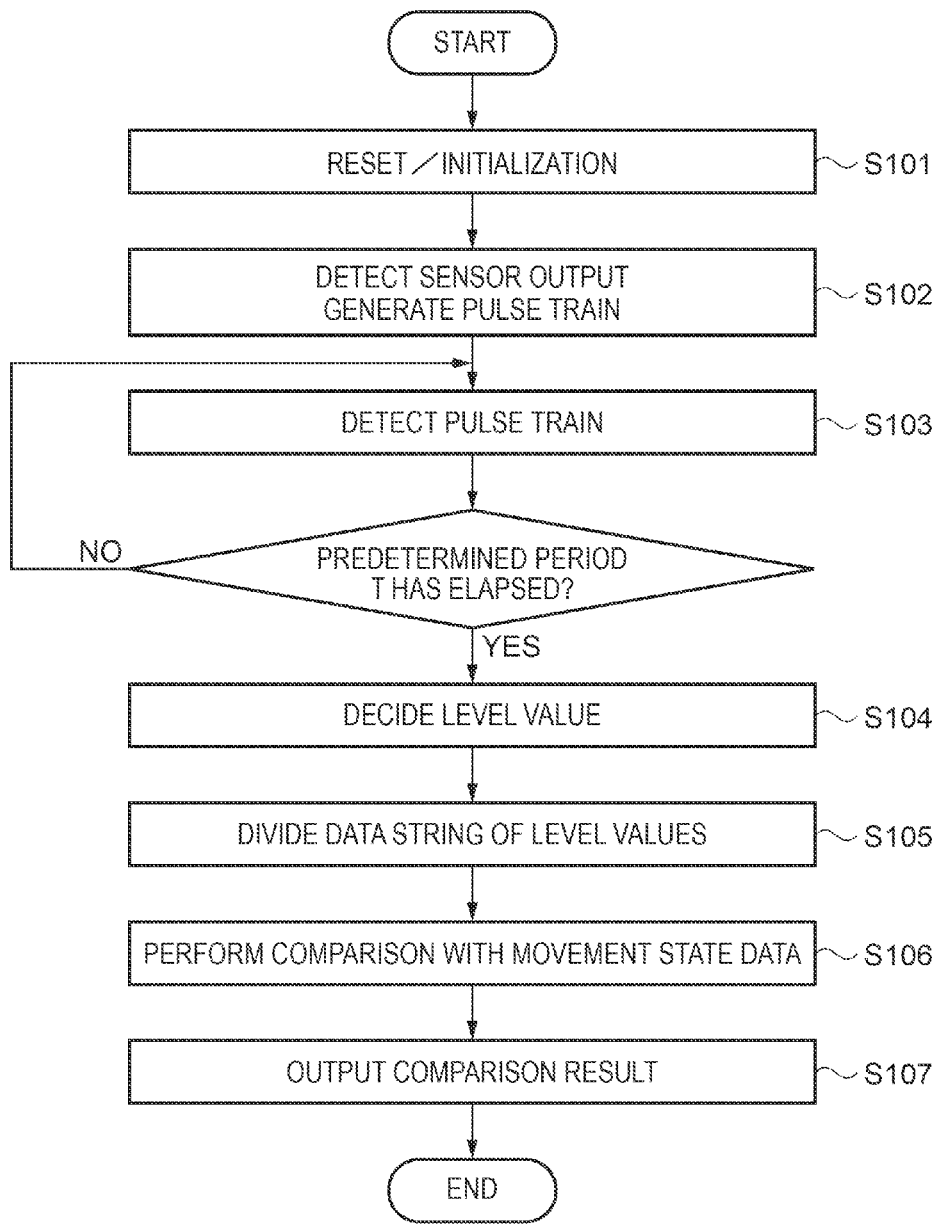
FIG. 9 is a flowchart for explaining a process flow in the first embodiment.

FIG. 9 shows an example of a process flow according to the flow of data of the inclination detection apparatus according to this embodiment. When the process is started, reset and initialization are performed (S101), signals indicating a state determined by the position of the spherical electric conductor are output from the sensor 1, and the detection section 2 generates pulse-train signals obtained by the determination made for these signals based on an appropriate threshold (S102). The pulse-train signals output from the detection section 2 are detected by the arithmetic processing section 3, and part of the pulse-train signals is stored in the accumulation section 4 during a predetermined period T (S103). When the arithmetic processing section 3 recognizes a lapse of the predetermined period T, the arithmetic processing section 3 decides a level value based on the pulse-train signals input during the predetermined period T and outputs the level value to the determination section 5 (S104). The determination section 5 divides a data string of level values thus input into an appropriate number of pieces of data (S105). The determination section 5 determines the movement state of the inclination detection apparatus based on comparison between the data strings obtained by division in S105 with the movement state data stored in the dictionary section 6 (S106), and outputs the comparison result (S107). Incidentally, the processing in S107 may be performed in such a way that the comparison result is output to the outside of the inclination detection apparatus, or may be performed in such a way that a memory is provided in the inclination detection apparatus and the comparison result is stored in the memory. The above-described flow according to the flow of data is repeated until a stop instruction is given. Moreover, FIG. 9 explains the process flow according to the flow of data, and the component elements of the inclination detection apparatus operate in parallel with the process flow.

Second Embodiment

This embodiment is a modified example of the first embodiment, and is obtained by changing the way of calculating a plurality of level values. The ratio between the ON time and the OFF time of a pair of electrodes in a predetermined period T is estimated from the difference between a first number which is the number of changes from OFF to ON in the predetermined period T and a second number which is the number of changes from ON to OFF in the predetermined period T. The plurality of level values are set as follows.

A case in which no change from ON occurs in the predetermined period T is assumed to be level 3.

A case in which [the first number]≥[the second number] in the predetermined period T is assumed to be level 2.

A case in which [the first number]<[the second number] in the predetermined period T is assumed to be level 1.

A case in which no change from OFF occurs in the predetermined period T is assumed to be level 0.

In FIG. 3, a chart of sampling in this embodiment is shown. Since a different way of setting a plurality of level values is adopted, the configurations of the detection section 2 and the arithmetic processing section 3 are different from those of the first embodiment. The detection section 2 includes a first differentiating circuit detecting a change from OFF to ON and a second differentiating circuit detecting a change from ON to OFF, and there is no need for a sampling clock. This makes it possible to configure the detection section 2 with a simpler circuit as compared to the first embodiment. In addition, since the arithmetic processing section 3 only has to calculate the difference between the first number and the second number in the predetermined period T, it is possible to make the configuration thereof simpler than that of the first embodiment. Furthermore, since the accumulation section 4 only has to have the function of counting and resetting the first number and the second number, it is also possible to realize the accumulation section 4 by providing a counter in the arithmetic processing section 3 without providing the accumulation section 4 as an independent circuit.

Moreover, in this embodiment, since there is no need for a sampling clock, it is not necessary to set the predetermined period T at a time interval which is the multiple of the sampling time. In the respects other than the differences described above, this embodiment can follow the first embodiment.

Third Embodiment

This embodiment is a modified example of the first embodiment, and is obtained by changing the way of calculating a plurality of level values. In this method, the ratio between the ON time and the OFF time of a pair of electrodes in a predetermined period T is directly used. The plurality of level values are set as follows.

A case in which no change from ON occurs in the predetermined period T is assumed to be level 3.

A case in which $1 > \{[\text{the ON time}]/[\text{the OFF time}]\} \geq 0.5$ in the predetermined period T is assumed to be level 2.

A case in which $0.5 > \{[\text{the ON time}]/[\text{the OFF time}]\} > 0$ in the predetermined period T is assumed to be level 1.

A case in which no change from OFF occurs in the predetermined period T is assumed to be level 0.

Figure 4:
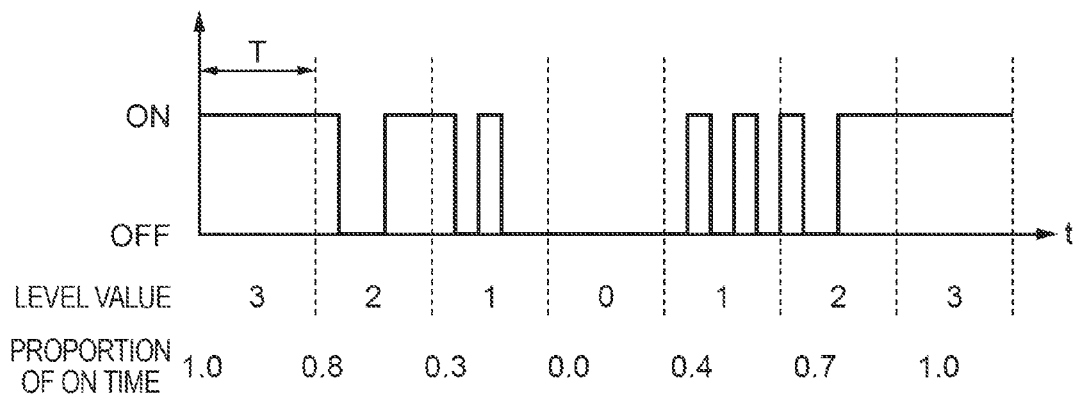
FIG. 4 is a chart showing conversion from a pulse train to a data string of a plurality of level values in a third embodiment.

In FIG. 4, a chart of sampling in this embodiment is shown. By using the first differentiating circuit and the second differentiating circuit used in the second embodiment and a timer, it is possible to measure ON and OFF in the predetermined period T. Since this embodiment calculates which of the plurality of level values the predetermined time T takes on by directly measuring the time interval, it is possible to set the level values accurately.

In this embodiment, the level values can be set accurately; however, since there is a need for a timer and division, the internal configuration of the arithmetic processing section 3 becomes complicated as compared to those of the first and second embodiments. Moreover, as is the case with the second embodiment, since there is no need for a sampling clock, this embodiment does not have to set the predetermined period T at a time interval which is the multiple of the sampling time. In the respects other than the differences described above, this embodiment can follow the first embodiment.

Although the embodiments of the invention have been described, the embodiments described above are not meant to limit the invention in any way. For example, in all the embodiments described above, a plurality of level values are set at four levels: 0 to 3; however, they may be set at any levels other than four levels. Moreover, the uses may be limited by using the movement state data which is obtained by setting more limited movements as target movements and is to be stored in the dictionary section 6 and thereby making the determination made by the determination section 5 more precise. Furthermore, the determination section 5 may be so configured as to detect only a specific movement.

The entire disclosure of Japanese Patent Application No. 2009-173997, filed Jul. 27, 2009 is expressly incorporated by reference herein.

What is claimed is:

1. A method comprising:
   an inclination detection apparatus comprising a pair of electrodes placed so as to face each other and having a fixed positional relation and a movable spherical electric conductor which can move between the pair of electrodes, wherein
   the pair of electrodes is in either a conducting state or a nonconducting state depending on the position of the movable spherical electric conductor,
   the conducting state in a predetermined period is expressed as any one of a plurality of level values, and
   a movement state of the pair of electrodes is estimated based on which of the plurality of level values the conducting state takes on;

wherein movement state data which relates a change in the plurality of level values to a change in a movement of the pair of electrodes is prepared, and a movement of a body provided with the pair of electrodes and the movable spherical electric conductor is estimated by comparing a detection result of a change in the plurality of level values corresponding to the plurality of periods with the movement state data.

2. The method of claim 1, wherein a change in the movement state of the pair of electrodes is estimated based on a change in values of the plurality of level values in the consecutive plurality of predetermined periods.

3. The method of claim 1, wherein the plurality of level values are each defined by a proportion of the time of the conducting state in the predetermined period.

4. The method of claim 1, wherein the predetermined period is the sum of a plurality of predetermined sampling times, detection of the conducting state and the nonconducting state is performed by performing sampling in the predetermined sampling time, when a result of the sampling indicates the conducting state, the pair of electrodes is considered to have been in the conducting state in a period of the last predetermined sampling time, and when a result of the sampling indicates the nonconducting state, the pair of electrodes is considered to have been in the nonconducting state in a period of the last predetermined sampling time.

5. The method of claim 1, wherein the predetermined period is defined as a gate time, first timing with which the pair of electrodes is changed from the nonconducting state to the conducting state and second timing with which the pair of electrodes is changed from the conducting state to the nonconducting state are detected, and a proportion of the time of the conducting state of the pair of electrodes in the gate time is detected based on the first timing and the second timing.

6. The method of claim 1, wherein the predetermined period is defined as a gate time, and based on a first number which is the number of changes of the pair of electrodes from the nonconducting state to the conducting state and a second number which is the number of changes of the pair of electrodes from the conducting state to the nonconducting state, a proportion of the time of the conducting state of the pair of electrodes in the gate time is estimated.

7. An inclination detection apparatus comprising:

a pair of electrodes placed so as to face each other and having a fixed positional relation; and a movable spherical electric conductor which can move between the pair of electrodes, wherein the pair of electrodes is in either a conducting state or a nonconducting state depending on the position of the movable spherical electric conductor, in a predetermined period, the conducting state is expressed as any one of a plurality of level values, and a movement state of the pair of electrodes is estimated based on which of the plurality of level values the conducting state takes on;

wherein movement state data which relates a change in the plurality of level values to a change in a movement of the pair of electrodes is prepared, and a movement of a body provided with the pair of electrodes and the movable spherical electric conductor is detected by comparing a detection result of a change in the plurality of level values with the movement state data.

8. The inclination detection apparatus according to claim 7, wherein the predetermined period is defined as a gate time, and based on a first number which is the number of changes of the pair of electrodes from the nonconducting state to the conducting state and a second number which is the number of changes of the pair of electrodes from the conducting state to the nonconducting state, a proportion of the time of the conducting state of the pair of electrodes in the gate time is determined.

9. The inclination detection apparatus according to claim 7, wherein the pair of electrodes has concave portions on the sides thereof facing each other, and the movable spherical electric conductor lies in a space formed by the concave portions of the pair of electrodes.

10. The inclination detection apparatus according to claim 7, wherein a change in the movement state of the pair of electrodes is estimated based on a change in the plurality of level values in the consecutive plurality of predetermined periods.

11. The inclination detection apparatus according to claim 7, wherein the plurality of level values are each determined by a proportion of the time of the conducting state in the predetermined period.

12. The inclination detection apparatus according to claim 7, wherein the predetermined period is the sum of a plurality of predetermined sampling times, detection of the conducting state and the nonconducting state is performed by performing sampling in the predetermined sampling time, when a result of the sampling indicates the conducting state, a period of the last predetermined sampling time is considered as the time in which the pair of electrodes has been in the conducting state, and when a result of the sampling indicates the nonconducting state, a period of the last predetermined sampling time is considered as the time in which the pair of electrodes has been in the nonconducting state.

13. The inclination detection apparatus according to claim 7, wherein the predetermined period is defined as a gate time, first timing with which the pair of electrodes is changed from the nonconducting state to the conducting state and second timing with which the pair of electrodes is changed from the conducting state to the nonconducting state are detected, and a proportion of the time of the conducting state of the pair of electrodes in the gate time is detected based on the first timing and the second timing.

* * * * *